United States Patent
Gu et al.

(10) Patent No.: US 11,762,893 B2
(45) Date of Patent: *Sep. 19, 2023

(54) CREATION OF A SUMMARY FOR A PLURALITY OF TEXTS

(71) Applicant: International Business Machines Corporation, Armonk, NY (US)

(72) Inventors: Yu Gu, Austin, TX (US); Takayuki Kushida, Tokyo (JP); Hiroki Nakano, Shiga (JP); Yaoping Ruan, White Plains, NY (US); Yuji Sugiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/550,121

(22) Filed: Dec. 14, 2021

(65) Prior Publication Data

US 2022/0100787 A1     Mar. 31, 2022

Related U.S. Application Data

(63) Continuation of application No. 16/451,746, filed on Jun. 25, 2019, now Pat. No. 11,238,078, which is a
(Continued)

(51) Int. Cl.
*G06F 16/35* (2019.01)
*G06F 16/34* (2019.01)
(Continued)

(52) U.S. Cl.
CPC .......... *G06F 16/345* (2019.01); *G06F 11/30* (2013.01); *G06F 16/35* (2019.01); *G06F 16/9027* (2019.01)

(58) Field of Classification Search
CPC .... G06F 16/345; G06F 16/35; G06F 16/9027; G06F 11/30
See application file for complete search history.

(56) References Cited

U.S. PATENT DOCUMENTS 6,728,752 B1 *   4/2004   Chen .................. G06F 16/34
                                                707/E17.058
8,402,027 B1 *   3/2013   Dange ................. G06F 18/231
                                                707/752

(Continued)

FOREIGN PATENT DOCUMENTS

WO     2016048283 A1     3/2016

OTHER PUBLICATIONS

Liu et al., "Improved Hierarchical K-means Clustering Algorithm without Iteration Based on Distance Measurement", 2014, IFIP Advances in Information and Communication Technology, vol. 432 pp. 38-46. (Year: 2014).*

(Continued)

*Primary Examiner* — Hosain T Alam
*Assistant Examiner* — Robert F May
(74) *Attorney, Agent, or Firm* — Edell, Shapiro & Finnan, LLC

(57) ABSTRACT

Creating a summary of a plurality of texts includes tokenizing each of a plurality of texts to obtain tokens; generating a vector space using a first set of vectors having one or more obtained feature scores equal to or larger than a predefined value; executing non-hierarchical clustering using the vector space to generate a first plurality of clusters; choosing a first representative text in each of the plurality of clusters; generating a second set of vectors from each of the arrays generated based on a number of characters included in tokens of the representative texts; executing hierarchical clustering using the second set of vectors to generate a second plurality of clusters; and in response to a determining (Continued)

a number of clusters included in the second plurality of clusters, determining a second representative text for each of the clusters included in the second plurality of clusters.

16 Claims, 14 Drawing Sheets

Related U.S. Application Data continuation of application No. 15/243,894, filed on Aug. 22, 2016, now Pat. No. 10,430,450.

(51) Int. Cl.
*G06F 16/901* (2019.01)
*G06F 11/30* (2006.01)

(56) References Cited

U.S. PATENT DOCUMENTS

| | | | | |
|---|---|---|---|---|
| 8,914,366 | B1* | 12/2014 | Li | G06F 16/285 |
| | | | | 707/739 |
| 10,430,450 | B2 | 10/2019 | Gu et al. | |
| 2002/0016798 | A1* | 2/2002 | Sakai | G06F 18/23 |
| | | | | 707/E17.09 |
| 2002/0022956 | A1* | 2/2002 | Ukrainczyk | G06F 40/20 |
| | | | | 707/E17.084 |
| 2002/0052692 | A1* | 5/2002 | Fahy | G16B 40/00 |
| | | | | 422/68.1 |
| 2003/0061242 | A1* | 3/2003 | Warmer | G06F 16/353 |
| 2005/0203970 | A1* | 9/2005 | McKeown | G06Q 10/10 |
| | | | | 707/999.203 |
| 2007/0239745 | A1* | 10/2007 | Guerraz | G06F 18/231 |
| 2007/0271287 | A1* | 11/2007 | Acharya | G06F 16/285 |
| 2011/0029523 | A1* | 2/2011 | Castillo | G06F 11/26 |
| | | | | 707/E17.089 |
| 2012/0109963 | A1* | 5/2012 | Mizuguchi | G06F 16/90 |
| | | | | 707/E17.089 |
| 2014/0037214 | A1* | 2/2014 | Deolalikar | G06V 10/7625 |
| | | | | 382/197 |
| 2014/0164376 | A1* | 6/2014 | Yang | G06F 16/355 |
| | | | | 707/737 |
| 2014/0324865 | A1* | 10/2014 | Mizutani | G06F 11/079 |
| | | | | 707/737 |
| 2017/0242891 | A1* | 8/2017 | Doan | G06F 16/2455 |
| 2018/0052918 | A1 | 2/2018 | Gu et al. | |
| 2019/0317956 | A1 | 10/2019 | Gu et al. | |

OTHER PUBLICATIONS

Lu et al. "Hierarchical Initialization approach for K-Means clustering" Pattern Recognition Letters, vol. 29, Issue 6, Apr. 2008, pp. 787-795. (Year: 2008).*
List of IBM Patents or Patent Applications Treated as Related, filed Dec. 15, 2021.

* cited by examiner

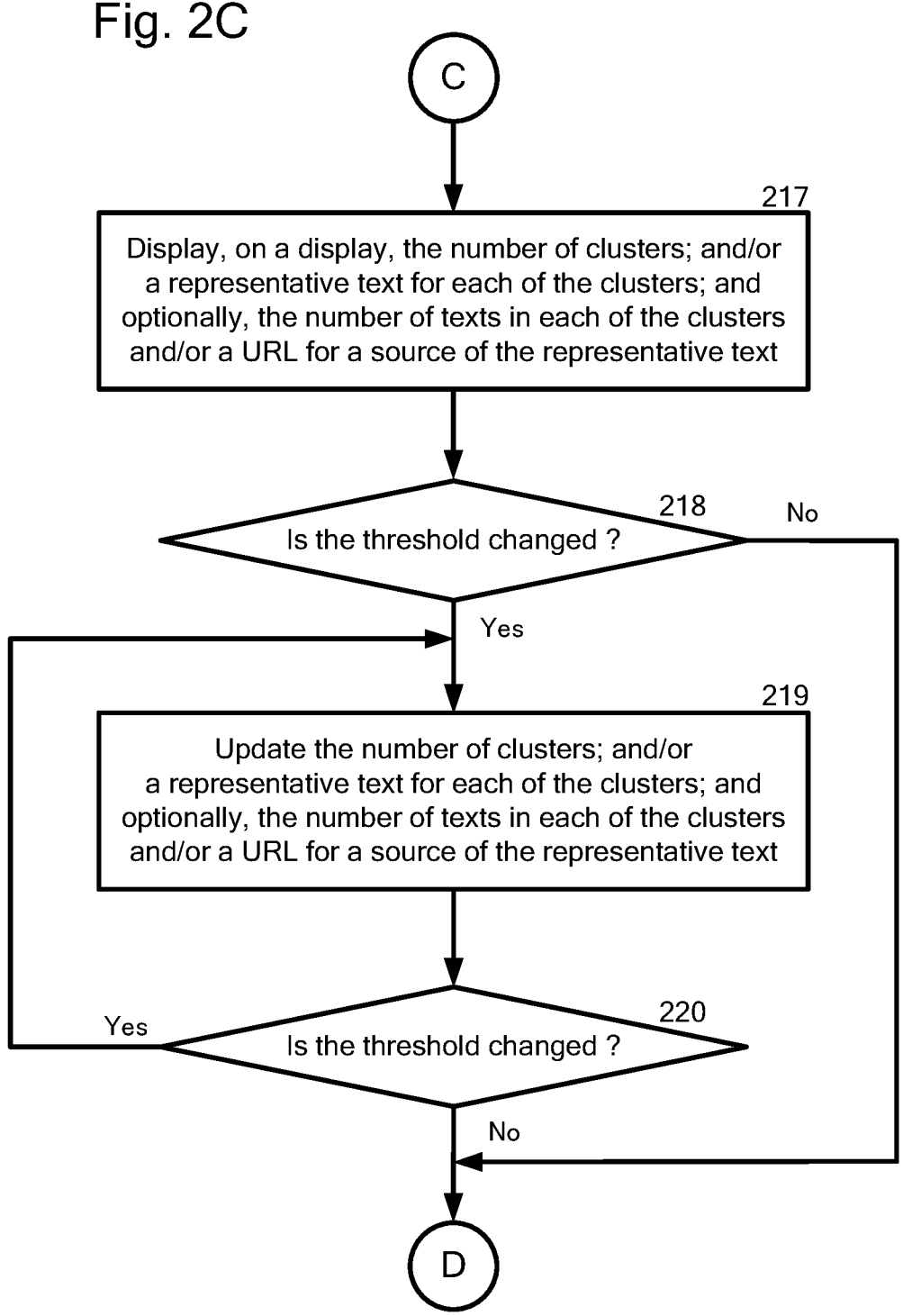

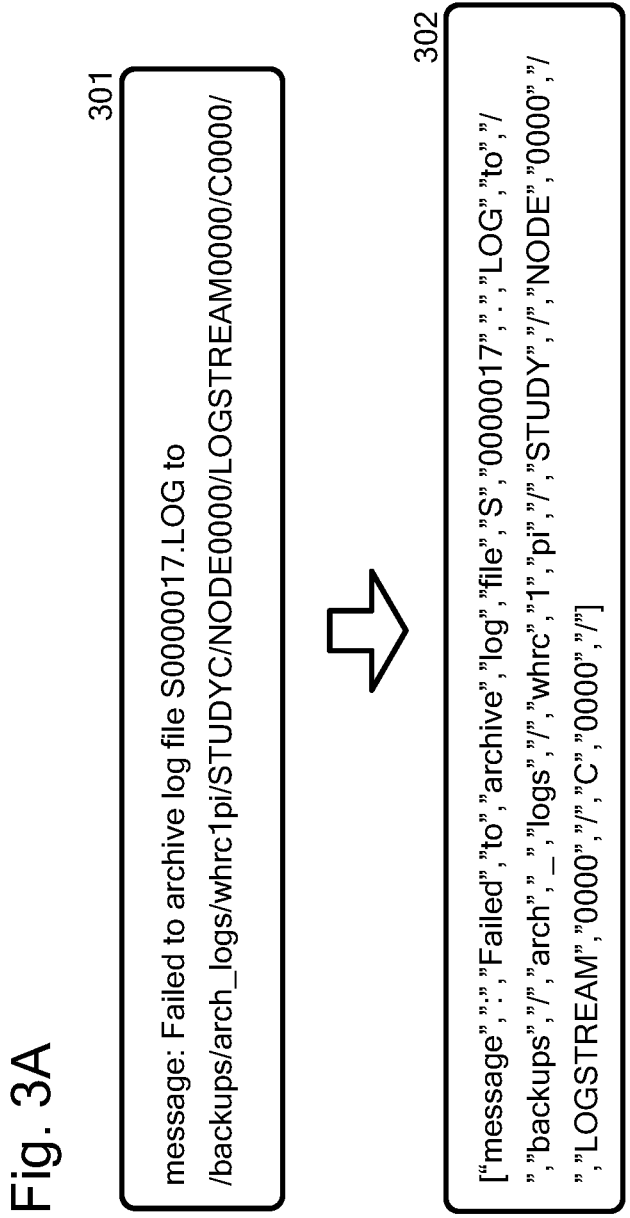

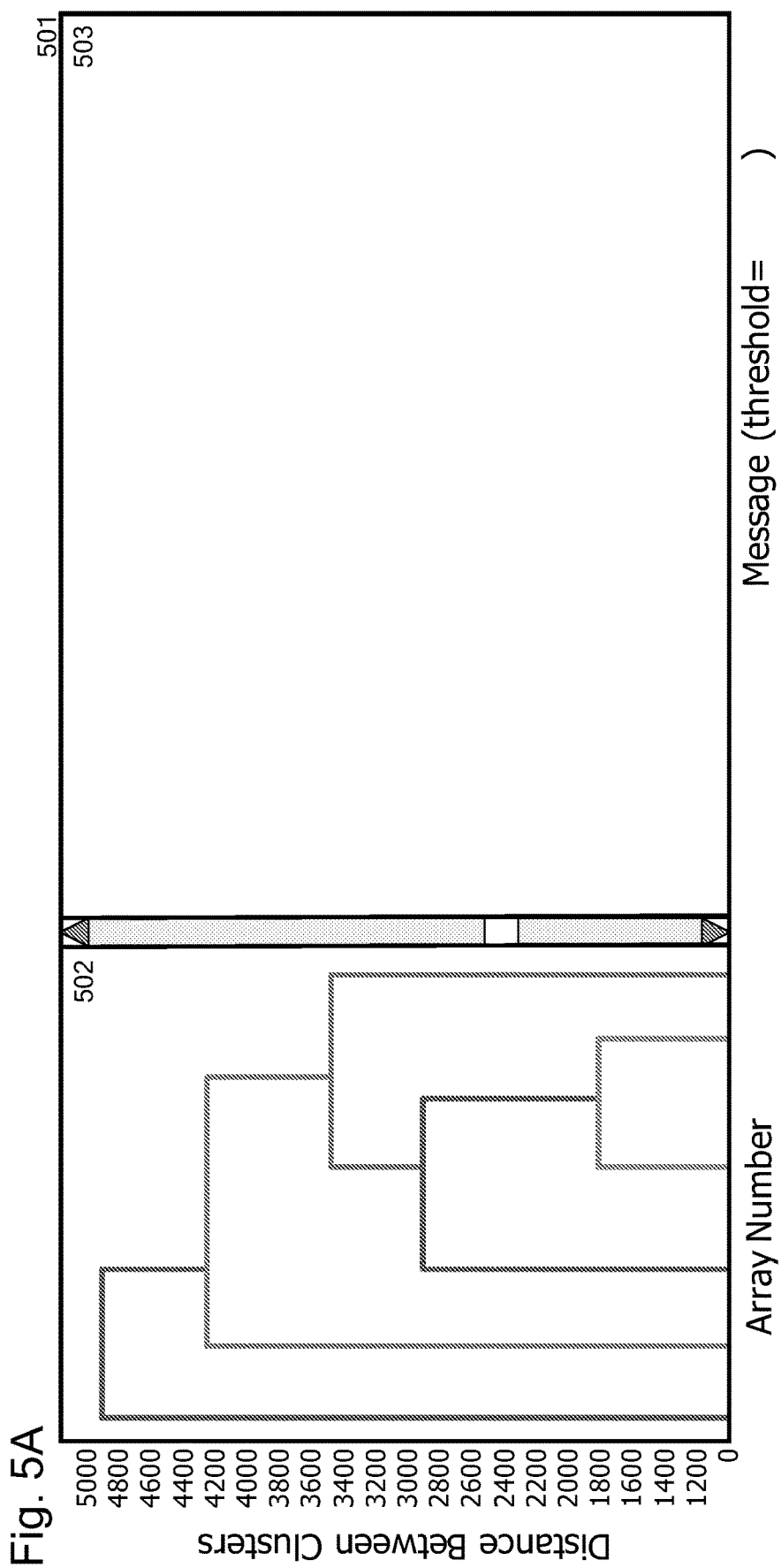

CREATION OF A SUMMARY FOR A PLURALITY OF TEXTS

BACKGROUND

The present invention relates to a summary creation for texts and more specifically, to a technique for summarizing a plurality of texts, using a hybrid clustering method.

Huge numbers of texts, such as log messages, are collected in servers. With log messages, a summary of the log messages is generated so that an error message is sent to an administrator in a predefined time interval and not overlooked.

SUMMARY

According to one aspect of an embodiment of the present invention, the embodiment of the present invention provides a computer-implemented method for summarizing a plurality of texts. The method comprises the followings: tokenizing each of a plurality of texts to obtain tokens; performing a feature analysis on each of the tokens to obtain feature scores; generating a first set of vectors, each vector in the first set of vectors having one or more obtained feature scores equal to or larger than a predefined value; generating a vector space using the first set of vectors; executing non-hierarchical clustering using the vector space to generate a first plurality of clusters; choosing a first representative text in each of the plurality of clusters; counting a number of characters in each token in each of the first representative texts to generate arrays of the number of the characters; generating a second set of vectors from each of the arrays; executing hierarchical clustering using the second set of vectors to generate a second plurality of clusters; and in response to a determining a number of clusters included in the second plurality of clusters, determining a second representative text for each of the clusters included in the second plurality of clusters.

According to another aspect of an embodiment of the present invention, a system, such as a computer system, comprising a computer readable storage medium storing program instructions executable by the computer system to perform one or more methods described herein also may be provided.

According to another aspect of an embodiment of the present invention, a computer program product comprising a computer readable storage medium having program instructions executable by at least one processor to cause the at least one processor to perform one or more methods described herein also may be provided.

BRIEF DESCRIPTION OF THE DRAWINGS

The disclosure will provide details in the following description of preferred embodiments with reference to the following figures.

FIGS. 2A to 2D illustrate a flowchart of a process for summarizing a plurality of texts, according to an example embodiment of the present invention.

FIG. 3A illustrates a method of tokenizing a text to obtain tokens, according to an example embodiment of the present invention.

FIGS. 5A to 5E illustrate a method of displaying a tree diagram, the number of clusters, and a representative text for each of the clusters, according to an example embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To more clearly define the terms used herein, exemplified definitions are provided hereinafter, but the meaning of the terms should be interpreted broadly as known to the technical field to which the present invention relates.

Figure 1:
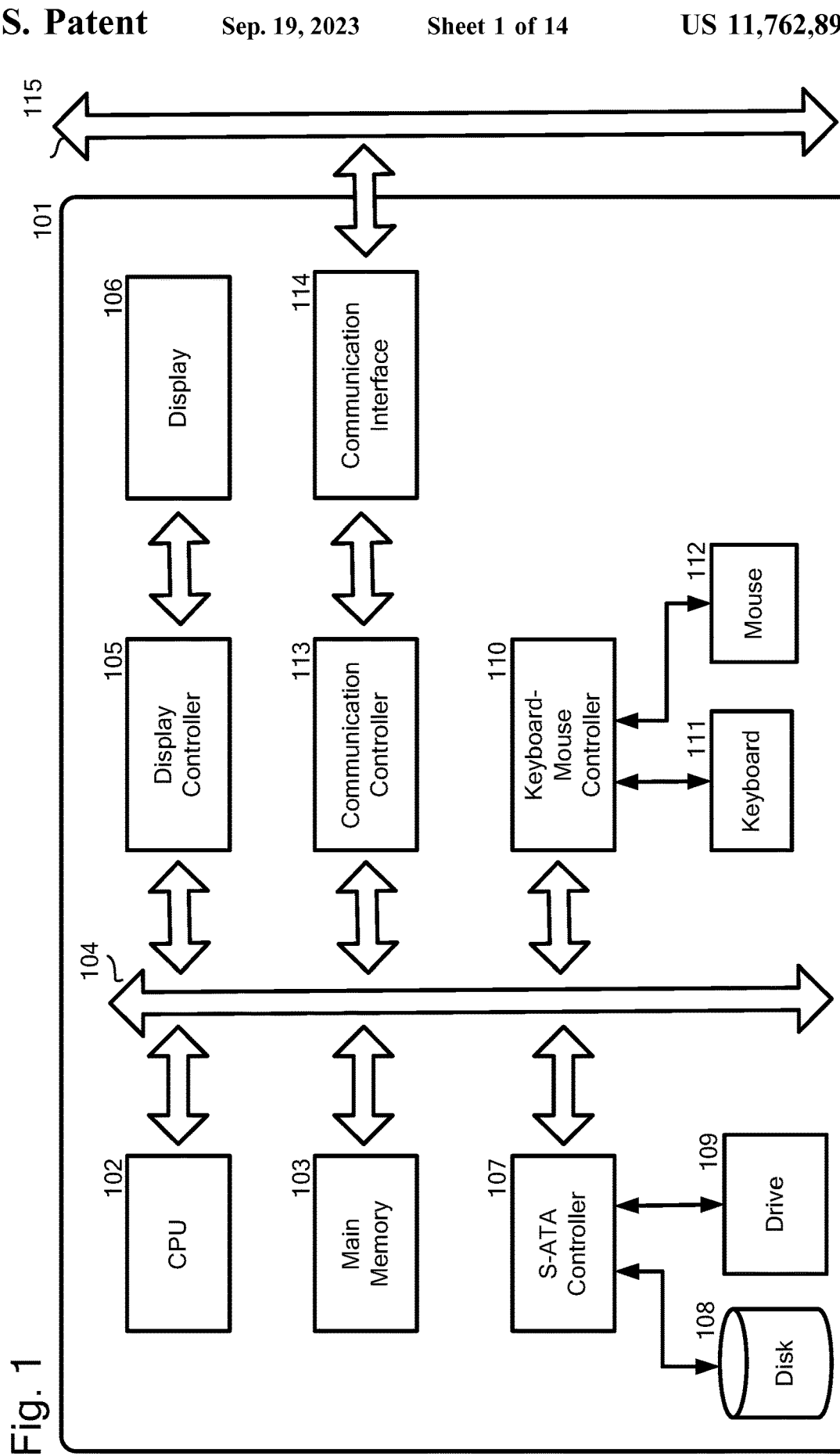
FIG. 1 illustrates an exemplified basic block diagram of a computer hardware used in an embodiment of the present invention.

With reference now to FIG. 1, an exemplified basic block diagram of a computer hardware used in an embodiment of the present invention is illustrated.

A computer (101) may be, for example, but is not limited to, a desktop, laptop, notebook or server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the POWER series of International Business Machines Corporation; the CORE i series, the CORE 2 series, the ATOM series, the XEON series, the PENTIUM series, or the CELERON series of INTEL Corporation; or the PHENOM series, the ATHLON series, the TURION series, or SEMPRON of Advanced Micro Devices, Inc. ("POWER" is registered trademark of International Business Machines Corporation in the United States, other countries, or both; "CORE i", "CORE 2", "ATOM", and "XEON" are trademarks, and "PENTIUM" and "CELERON" are registered trademarks of INTEL Corporation in the United States, other countries, or both; "PHENOM", "ATHLON", "TURION", and "SEMPRON" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be for example, but not limited to, a LCD, PDP, OEL or a projection type display. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing WINDOWS, UNIX MAC OS, LINUX, A JAVA, or any other processing environment, JAVA applications, a JAVA virtual machine (VM), and a JAVA just-in-time (JIT) compiler, such as J2EE, other programs, and any data may be stored in the disk (108) to be loadable to the main memory. ("WINDOWS" is a registered trademark of Microsoft corporation in the United States, other countries, or both; "UNIX" is a registered trademark of the Open Group in the United States, other countries, or both; "MAC OS" is a registered trademark of Apple Inc. in the United States, other countries, or both; "LINUX" is a registered trademark of Linus Torvalds in the United States, other countries, or both; and "JAVA" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE 802.11a/b/g/n ("IEEE" is a registered trademark of Institute of Electrical and Electronics Engineers, Inc. in the United States, other countries, or both).

Hereinafter, an embodiment of the present invention will be described with reference to FIGS. 2A to 2D, FIGS. 3A and 3B, FIG. 4, FIGS. 5A to 5E and FIG. 6.

The idea of an embodiment of the present invention is on the basis of the following perceptions:

A huge number of texts is now collected. There is need to quickly summarize them for analysis. A clustering or cluster analysis can be used for summarizing them.

The clustering or cluster analysis is the task of grouping a set of objects in such a way that objects in the same group or cluster are more similar in some sense or another to each other than to those in other groups or clusters. There are two main classes of cluster analysis, non-hierarchical clustering and hierarchical clustering.

The non-hierarchical clustering may refer to an algorithmic approach to find a grouping of objects which maximizes or minimizes some evaluating criterion. The following algorithms can be used as non-hierarchical clustering: k-means or its derivatives methods such as k-means++; or Gaussian Mixture Model; GMM).

The hierarchical clustering may refer to an algorithmic approach to find discrete groups with varying degrees of (dis)similarity in a data set represented by a (dis)similarity matrix. The hierarchical clustering may be mainly divided into two groups: divisive hierarchical clustering and agglomerative hierarchical clustering. The latter, agglomerative hierarchical clustering can be generally used in the hierarchical clustering. The following algorithms can be used as hierarchical clustering: nearest neighbor method (also called as "single linkage method"), furthest neighbor method (also called as "complete linkage method"); group average method; or Ward's method.

K-means can classify texts easily, but it is necessary to decide the fixed number of clusters beforehand. Therefore, in a case where types of texts are increased, types of texts included in each clusters are also increased. Accordingly, there is a problem with the clustering of accuracy. Meanwhile, the hierarchical clustering can adjust the number of clusters freely. However, the hierarchical clustering needs much CPU workload in a case where the number of texts increases.

Accordingly, each of the non-hierarchical clustering and the hierarchical clustering has advantage and disadvantage. In a case where the number of texts is huge, it may be difficult to create summary from the texts in a predefined period. This may cause a overlooking of an important text, such as an error message.

With reference now to FIGS. 2A to 2D, an embodiment of a flowchart of a process for summarizing a plurality of texts is illustrated.

A system, such as the computer (101), performs each of the steps described in each of FIGS. 2A to 2D. The computer may be implemented as a single computer or plural computers.

Figure 2A:
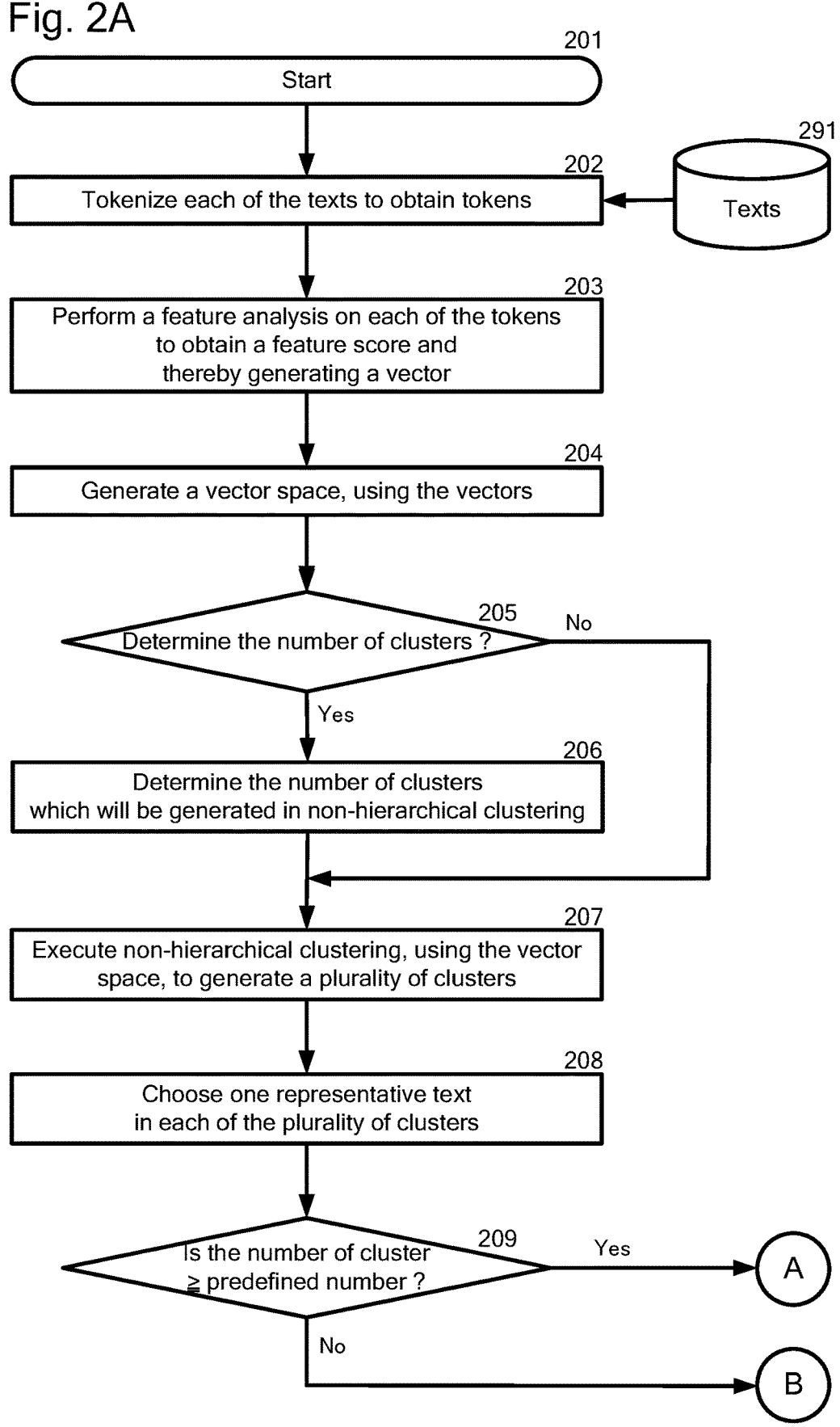

With reference now to FIG. 2A, in step 201, the system starts the process for summarizing a plurality of texts.

Texts may comprise, for example, but not limited to: log messages which can be sent from one or more servers; texts obtained from a speech recognition system; mails; or business texts.

In step 202, the system may receive one or more texts from one or more servers and store them into a storage (291). The system can receive one or more texts on the fly (e.g., in real time). The system may read texts from the storage (291). The system then tokenizes each of the texts to obtain tokens. Any method known in the art for tokenizing texts can be used. For example, any tokenizer, such as nltk.word_tokenize which is included in nltk.tokenize package can be used. The tokenizer can divide the text into a sequence of tokens, which roughly correspond to "words".

An example of tokenizing a text will be explained by referring to FIG. 3A.

With reference now to FIG. 3A, FIG. 3A illustrates an embodiment of tokenizing a text to obtain tokens.

Let us suppose that the text is as follow: "message: Failed to archive log file S0000017.LOG to/backups/arch_logs/ whrc1pi/STUDYC/NODE0000/LOGSTREAM0000/ C0000/" (301).

The system tokenizes the text (301) and then the following tokens can be obtained: ["message",":","Failed","to", "archive","log","file","S","0000017",".","LOG","to","/", "backups", "/","arch","_","logs","/","whrc","1","pi","/", "STUDY","/","NODE","0000","/","LOGSTREAM", "0000","/","C","0000","/"] (302).

With reference now back to FIG. 2A, in step 203, the system performs a feature analysis on each of the tokens to obtain a feature score. The feature analysis can be done, for example, but not limited to, using Term Frequency and Inverse Document Frequency (TF-IDF) analysis. The TF-IDF analysis itself is known in the art.

The system then chooses one or more feature scores equal to or larger than a predefined value. The predefined value may be determined by, for example, a user or administrator.

The system then generates a vector comprising the one or more chosen feature scores. The system generates a vector in each of the texts (e.g., to generate a first set of vectors).

In step 204, the system generates a vector space, using the vectors each of which vectors was generated in each of the texts.

In step 205, the system judges whether the determination of the number of clusters which will be generated in non-hierarchical clustering mentioned below is made or not. If the judgment is positive, the system proceeds to step 206 to dynamically determine the number of clusters which will be generated in non-hierarchical clustering. If the judgment is negative, the system proceeds to step 207 and the predefined number of clusters, which was already determined prior to start the step 201 mentioned above, will be used in step 207.

In step 206, the system determines the number of clusters which will be generated in non-hierarchical clustering (e.g., the number of clusters included in a first plurality of clusters). The number of clusters may be determined according to the number of the texts. The number of clusters may be set to 1/n, of the total number of the texts, where n refers to a positive integer, for example, but not limited to, 10, 20, . . . , 100, . . . , 1000, . . . , etc. In a case where the number of clusters is, for example, but not limited to, ⅕ of the total number of the texts, the non-hierarchical clustering will be executed correctly, but it may cause a lot of overlaps. The number of clusters which is set to the total number of texts may be determined by a type of logs.

In step 207, the system executes non-hierarchical clustering, using the vector space, to generate the determined number of clusters to which each text belongs.

In step 208, the system chooses one representative text in each of the determined number of clusters (e.g., in each of the clusters included in the first plurality of clusters). The non-hierarchical clustering results in a partitioning of the texts set by clustering the text around the representative text. Accordingly, the representative text can be chosen in each cluster.

In step 209, the system judges whether the number of clusters (e.g. in the first plurality of clusters) is equal to or larger than a predefined number or not. If the judgment is positive, the system proceeds to step 210 described in FIG. 2B. Meanwhile, if the judgment is negative, the system proceeds to step 221 described in FIG. 2D in order to display a result of the execution of the non-hierarchical clustering or to a final step 222 described in FIG. 2D. The predefined number may be determined by a user or administrator. The number may be, for example, but not limited to, ten.

Figure 2B:
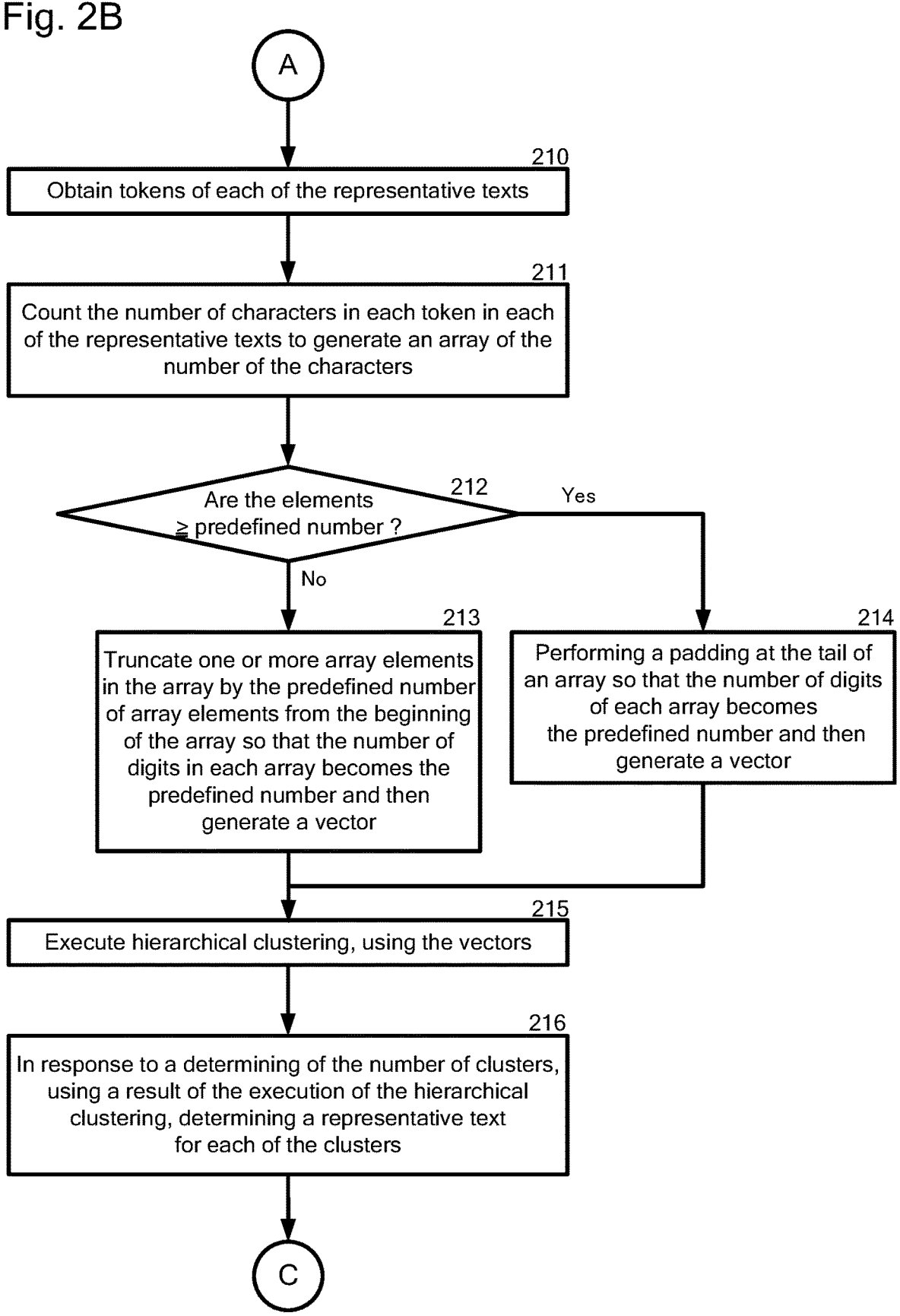

With reference now to FIG. 2B, in step 210, the system obtains tokens of each of the representative texts. The tokens may be the one generated in step 201 or newly generated in step 210.

In step 211, the system counts the number of characters in each token in each of the representative texts to generate an array of the number of the characters. A set of arrays can be generated from each of the texts.

An example of tokenizing a text will be explained by referring to FIG. 3B.

Figure 3B:
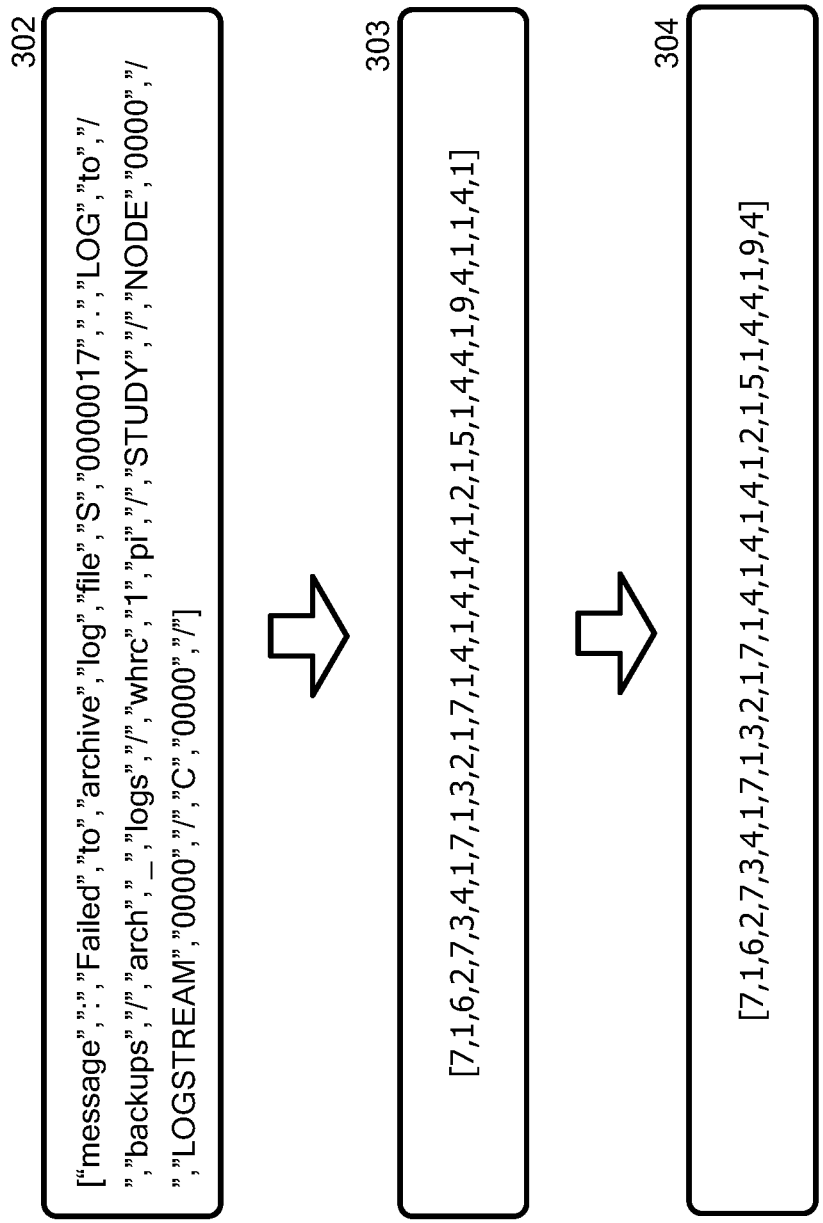
FIG. 3B illustrates a method of counting the number of characters in each token and then generating a vector from each of the arrays, according to an example embodiment of the present invention.

With reference now to FIG. 3B, FIG. 3B illustrates an embodiment of counting the number of characters in each token and then generating a vector from each of the arrays.

Let us suppose that a representative text is the one (301) described in FIG. 3A. Therefore, the obtained tokens are the one (302) described in FIG. 3B. Accordingly, the tokens obtained from the text (301) it the one (302) described in FIG. 3A and 302.

The system counts the number of characters in each token in the tokens (302). The system then generates an array (303) described in FIG. 3B.

The array (303) has 34 elements obtained from each token.

With reference now back to FIG. 2B, in step 212, the system judges whether the number of elements in the array is equal to or larger than a predefined number or not. If the judgment is positive, the system proceeds to step 213. Meanwhile, if the judgment is negative, the system proceeds to step 214.

The predefined number may be determined by a user or administrator. The predefined number may be, for example, but not limited to, thirty.

In step 213, the system truncates one or more array elements in the array by the predefined number of array elements from the beginning of the array so that the number of digits in each array becomes the predefined number in order to align the dimension of each of the vectors (e.g. each of the vectors in a second set of vectors).

The system then generates a vector comprising array elements after the truncation mentioned above (e.g., a vector in the second set of vectors).

An example of truncating one or more array elements in the array by the predefined number of array elements from the beginning of the array will be explained by referring to FIG. 3B.

With reference now to FIG. 3B, FIG. 3B illustrates an embodiment of truncating one or more array elements in the array by the predefined number of array elements from the beginning of the array.

Let us suppose that the predefined number of array elements from the beginning of the array is 30 (or thirty).

The array (303) has 34 array elements. The number of array elements is larger than the predefined number of array elements from the beginning of the array. Accordingly, the system truncates the array (303) by 30 array elements from the beginning of array (303) by deleting the last four elements, {1, 1, 4, 1}, from the array (303) to generate the array (304) having 30 array elements.

With reference now back to FIG. 2B, in step 214, the system performs a padding at the tail of an array so that the number of digits in each array becomes the predefined number in order to align the dimension of each of the vectors. The padding may be, for example, a zero-padding. Namely, the system fills zero elements at the tail of an array so that the number of digits in each array becomes the predefined number in order to align the dimension of each of the vectors.

In step 215, the system executes hierarchical clustering, using the vectors from steps 213 and 214 (e.g., the second set of vectors). In the hierarchical clustering, the system measures distance of each of the vectors. The distance may be calculated, for example, using the following methods: Euclidean distance; Squared Euclidean distance; Manhattan distance; maximum distance; Mahalanobis distance; Hamming distance; or Levenshtein distance.

In step 215, the system may assign the array number to each array.

After the execution of the hierarchical clustering, for example, a tree diagram may be generated as a result of the execution of the hierarchical clustering. The tree diagram may be a dendrogram. A tree diagram may be a tree diagram frequently used to illustrate the arrangement of the clusters generated by the hierarchical clustering. An example of a tree diagram will be explained by referring to FIG. 4.

Figure 4:
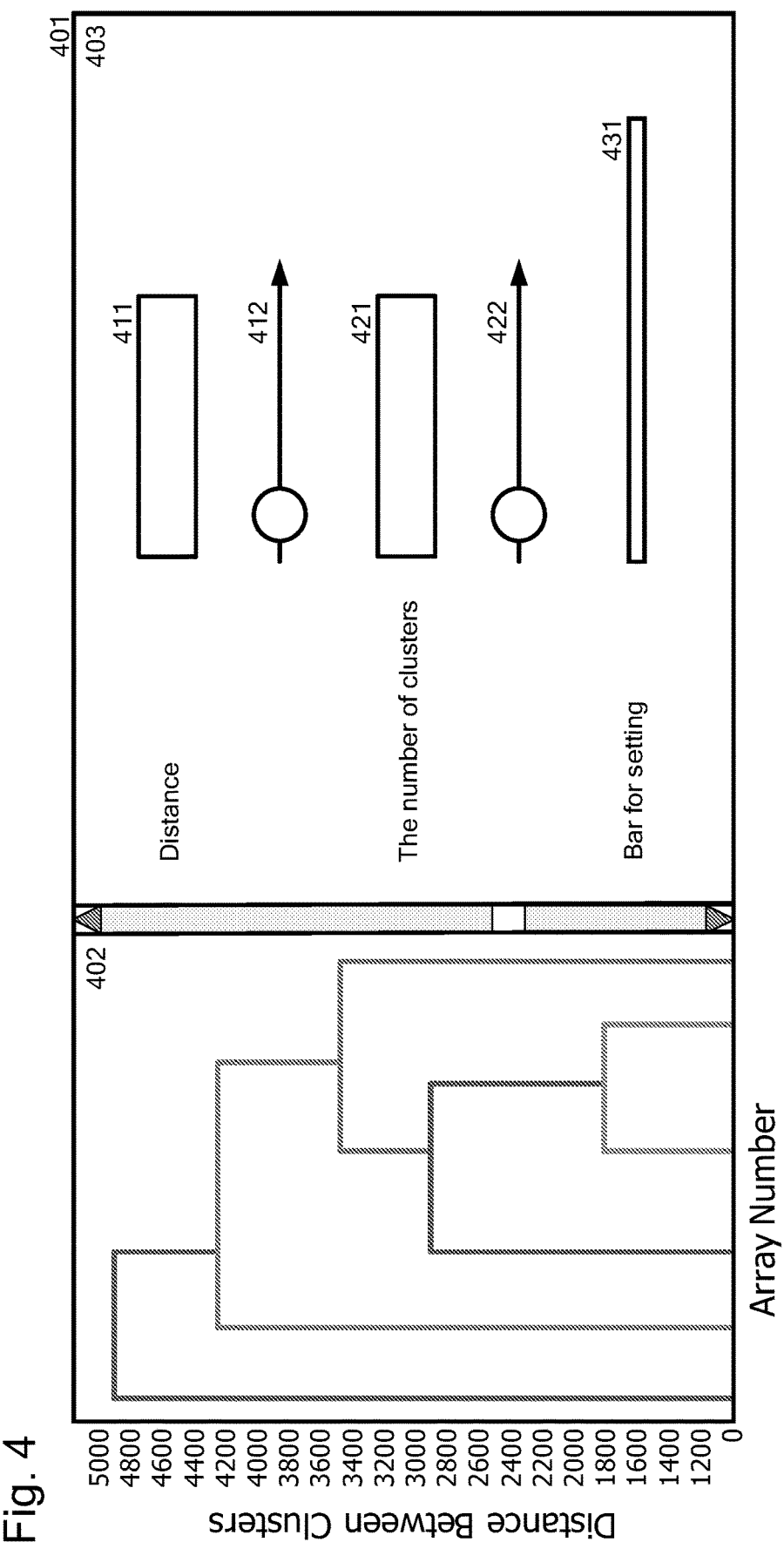
FIG. 4 illustrates a method of setting or changing a threshold of a distance between the clusters or of the number of clusters, according to an example embodiment of the present invention.

With reference now to FIG. 4, FIG. 4 illustrates an embodiment of a tree diagram.

A vertical axis of the tree diagram represents the distance or dissimilarity between clusters. The horizontal axis of the tree diagram represents the array number, where a set of arrays represents each text.

With reference now back to FIG. 2B, in step 216, in response to a determining of the number of clusters (e.g., the number of clusters included in a second plurality of clusters, created based on the second set of vectors), using a result of the execution of the hierarchical clustering, the system determines representative text for each of the clusters.

The number of clusters can be determined manually by a user or automatically by the system.

In a case where a user determines the number of clusters, the user may use the tree diagram for determining the number of clusters. The tree diagram may be displayed on a display for the user. An example of determining the number of clusters by the user will be explained by referring to FIG. 4 and FIGS. 5A to 5E mentioned below.

In a case where a user determines a distance between the clusters which are obtained as a result of the execution of the hierarchical clustering, namely, a distance between the clusters on the tree gram, the system may determine the number of clusters, using the tree diagram and the determined distance between the clusters on the tree diagram.

In a case where the system determines the number of clusters, the system may determine the number of clusters, using the tree diagram.

According to the number of clusters, a representative text for each of the clusters can be updated, using the tree diagram. An example of updating a representative text for each of the clusters will be explained by referring to FIG. 4 and FIGS. 5A to 5E mentioned below.

With reference now to FIG. 2C, in step 217, the system may display, on a display, the number of clusters, and/or a representative text for each of the clusters; and optionally, the number of texts in each of the clusters and/or a URL for a source of the representative text, all of which are obtained from the sequential execution of the non-hierarchical clustering and the hierarchical clustering. In a case where the URL for source of the representative text is clicked or touched by a user, the display shows contents in the URL which may comprise the original text of the representative text.

An example of the display will be explained by referring to FIGS. 5B to 5E mentioned below.

In step 218, the system judges whether a threshold to the tree diagram is changed or not. The threshold may be the number of clusters, or the distance between the clusters represented in the tree diagram. If the judgment is positive, the system proceeds to step 219. Meanwhile, if the judgment is negative, the system proceeds to the final step 222. In a case where the system does not receive any action from a user in a predetermined time, the system may judge that a threshold to the tree diagram is not changed.

An example of changing the threshold to the tree diagram will be explained by referring to FIG. 4 mentioned below.

With reference now to FIG. 4, FIG. 4 illustrates an embodiment of setting or changing a threshold of a distance between the clusters or of the number of clusters.

The system may display a window (401) for displaying a tree diagram window (402) and tools window (403) for setting or changing a threshold of a distance between the clusters or of the number of clusters.

The tool window (403) may show a tool for setting or changing a threshold of a distance between the clusters (411, 412 or 431) or of the number of clusters (421, 422 or 431)

The tool (411) can allow a user to input a distance between clusters on the tree diagram. The user can input in the tool (411) a distance on the vertical axis of the tree diagram, while looking at the tree diagram, in order to set or change the distance on the tree diagram. In response to the input of the distance by the user, the system may display, on the tree diagram, a bar icon which cuts the tree diagram at the distance input by the user. The bar icon also defines the number of clusters together with the distance.

The tool (412) can allow a user to set a distance between clusters on the tree diagram, using a slider bar. The user can move a slider, while looking at the tree diagram, in order to set or change a distance on the tree diagram. In response to the movement of the slider bar, the system may display, on the tree diagram, a bar icon which cuts the tree diagram at the distance set by the slider bar. The bar icon also defines the number of clusters together with the distance.

The tool (421) can allow a user to input the number of clusters on the tree diagram. The user can input in the tool (421) the number of clusters, while looking at the tree diagram, in order to set or change the number of clusters on the tree diagram. In response to the input of the number of clusters by the user, the system may display, on the tree diagram, a bar icon which cuts the tree diagram at the number of clusters input by the user. The bar icon also defines the distance together with the number of clusters.

The tool (422) can allow a user to set the number of clusters on the tree diagram, using a slider bar. The user can move a slider, while looking at the tree diagram, in order to set or change the number of clusters on the tree diagram. In response to the movement of the slider bar, the system may display, on the tree diagram, a bar icon which cuts the tree diagram at the number of clusters set by the slider bar. The bar icon also defines the distance together with the number of clusters.

The tool (431) can allow a user to set a distance between clusters on the tree diagram or the number of clusters on the tree diagram. The user can move a bar icon directly on the tree diagram to set or change a distance between clusters or the number of clusters. In response to the movement of the bar icon, the system may display, on the tree diagram, a bar icon which cuts the tree diagram. The bar icon defines the distance and the number of clusters.

In step 219, the system may update the number of clusters, and/or a representative text for each of the clusters; and optionally, the number of texts in each of the clusters and/or a URL for a source of the representative text and then display, on the display, the updated number of clusters, and/or the updated representative text for each of the clusters; and optionally, the updated number of texts in each of the clusters and/or a URL for a source of the updated representative text.

In step 220, the system again judges whether a threshold to the tree diagram is changed or not. The threshold may be the number of clusters, or the distance between the clusters represented in the tree diagram. If the judgment is positive, the system proceeds back to step 219. Meanwhile, if the judgment is negative, the system proceeds to the final step 222. In a case where the system does not receive any action from a user in a predetermined time, the system may judge that a threshold to the tree diagram is not changed.

In step 221, the system may display, on a display, the number of clusters, and/or a representative text for each of the clusters; and optionally, the number of texts in each of the clusters and/or a URL for a source of the representative text, all of which are obtained from the execution of the non-hierarchical clustering only.

In step 222, the system terminates the process mentioned above.

An embodiment of the flowchart of the process mentioned above may allow the system to summarize the texts in a scalable manner and to report the summary of the texts with clarity.

FIGS. 5A to 5E illustrate an embodiment of displaying a tree diagram, the number of clusters, and a representative text for each of the clusters. The texts which were summarized according to an embodiment of the present invention are error log massages derived from one or more servers.

With reference now to FIG. 5A, FIG. 5A illustrates an embodiment of a window (501) displaying a tree diagram window (502) and a message window (503).

The tree diagram window (502) shows the tree diagram. The tree diagram can be displayed in the tree diagram window (502) after the execution of the hierarchical clustering.

The message window (503) may show a representative text for each of the clusters, and the number of texts in each of the clusters and/or URL for a source of the representative text.

If the default distance between the clusters or the default number of clusters is set to the tree graph, a representative text for each of the clusters can be shown in the message window (503).

Figure 5B:
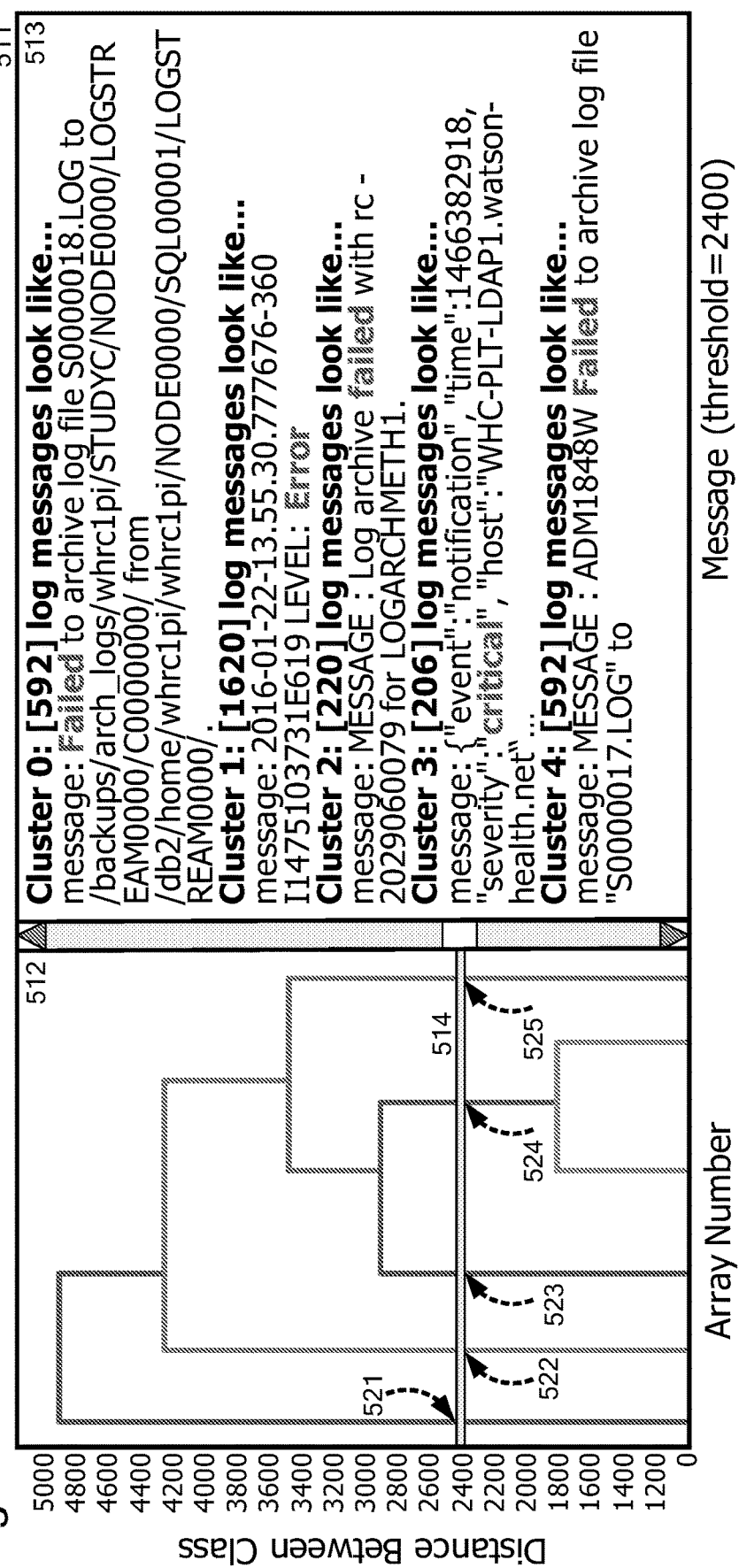

With reference now to FIG. 5B, FIG. 5B illustrates an embodiment of a window (511) displaying a tree diagram window (512) and a message window (513).

The tree diagram window (512) shows that the bar icon (514) is displayed on the tree graph at a distance between the clusters, 2400. The location of the bar icon (514) mean that a distance between the clusters is set to "2400" or that the number of clusters is set to "five" (521, 522, 523, 524 and 525).

The message window (513) shows five clusters, Clusters 0 to 4, each of which corresponds to each of the five cross points (521, 522, 523, 524 and 525). In each cluster, the following information is displayed: the number of texts in each of the clusters, using "[the number]", and a representative text. In the representative text, one or more predefined terms, such as an attention keyword, may be displayed with highlight in order to draw attention of a user. The highlight may be made, for example, but not limited to, by coloring the keyword, or making the keyword bold or italic. In a case where the representative text obtained after the execution of the hierarchical clustering has a predefined term, the system may send an alert to a user or displaying an alert on a display.

In an embodiment of FIG. 5B, the texts were classified into five clusters. In a case where the texts are error log messages, there are error log messages having contents which are the same or similar with other contents other than the time stamp. Therefore, it is assumed that texts are well formatted with fixed length tokens. Accordingly, the same type of texts has the same token patterns in terms of character count in each token.

Figure 5C:
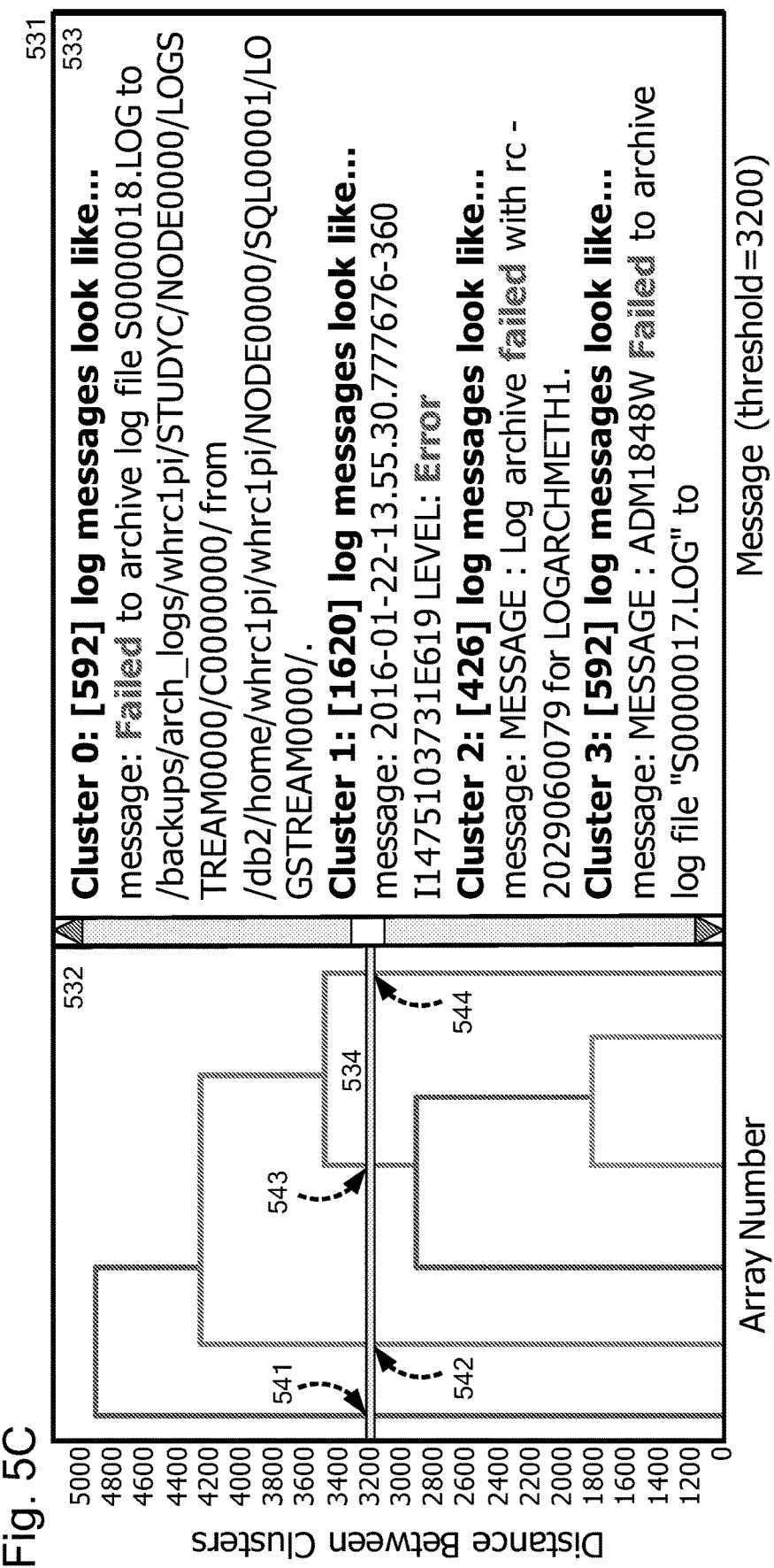

With reference now to FIG. 5C, FIG. 5C illustrates an embodiment of a window (531) displaying a tree diagram window (532) and a message window (533).

The tree diagram window (532) shows the tree diagram which is the same as that displayed on the tree diagram window (512) described in FIG. 5B. The tree diagram window (532) further shows that the bar icon (544) is displayed on the tree graph at a distance between the clusters, 3200. The location of the bar icon (544) mean that a distance between the clusters is set to "3200" or that the number of clusters is set to "four" (541, 542, 543 and 544).

The message window (533) shows four clusters, Clusters 0 to 3, each of which corresponds to each of the four cross points (541, 542, 543 and 544). In each cluster, the following information is displayed: the number of texts in each of the clusters, using "[the number]", and a representative text. In the representative text, one or more predefined terms, such as an attention keyword, may be displayed with highlight in order to draw attention of a user. The highlight may be made, for example, but not limited to, by coloring the keyword, or making the keyword bold or italic. In a case where the representative text obtained after the execution of the hierarchical clustering has a predefined term, such as an attention keyword, the system may send an alert to a user or displaying an alert on a display.

In an embodiment of FIG. 5C, the texts were classified into four clusters. The same arguments described in FIG. 5B applied also to FIG. 5C.

Figure 5D:
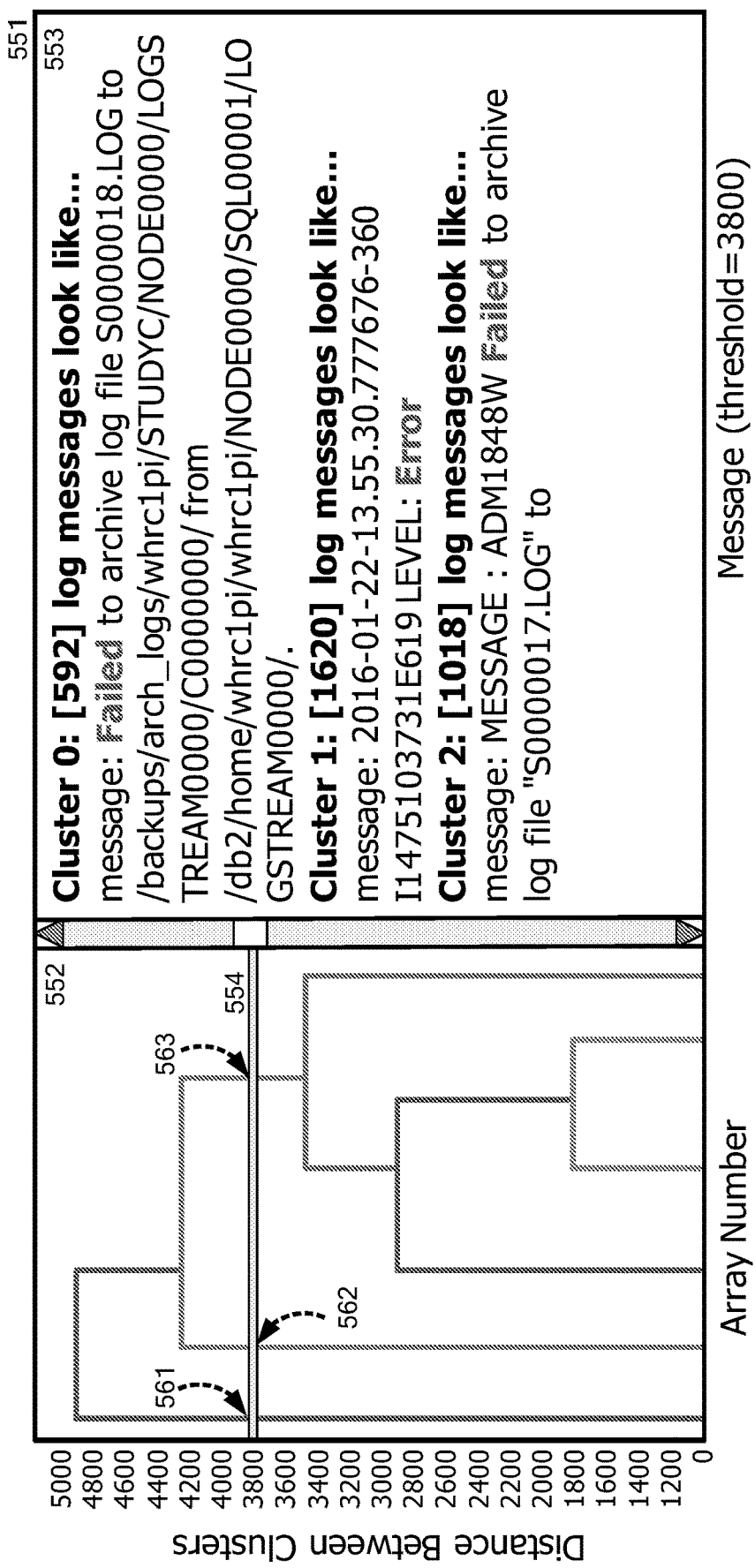

With reference now to FIG. 5D, FIG. 5D illustrates an embodiment of a window (551) displaying a tree diagram window (552) and a message window (553).

The tree diagram window (552) shows the tree diagram which is the same as that displayed on the tree diagram window (512) described in FIG. 5B. The tree diagram window (552) further shows that the bar icon (554) is displayed on the tree graph at a distance between the clusters, 3800. The location of the bar icon (554) mean that a distance between the clusters is set to "3800" or that the number of clusters is set to "three" (561, 562 and 563).

The message window (553) shows three clusters, Clusters 0 to 2, each of which corresponds to each of the three cross points (561, 562 and 563). In each cluster, the following information is displayed: the number of texts in each of the clusters, using "[the number]", and a representative text. In the representative text, one or more predefined terms, such as an attention keyword, may be displayed with highlight in order to draw attention of a user. The highlight may be made, for example, but not limited to, by coloring the keyword, or making the keyword bold or italic. In a case where the representative text obtained after the execution of the hierarchical clustering has a predefined term, the system may send an alert to a user or displaying an alert on a display.

In an embodiment of FIG. 5D, the texts were classified into three clusters. The same arguments described in FIG. 5B applied also to FIG. 5D. Further, even when contents of the texts are more or less different, clusters having a strong degree of approximation can be combined with each other, compared to embodiments described in FIGS. 5B and 5C.

Figure 5E:
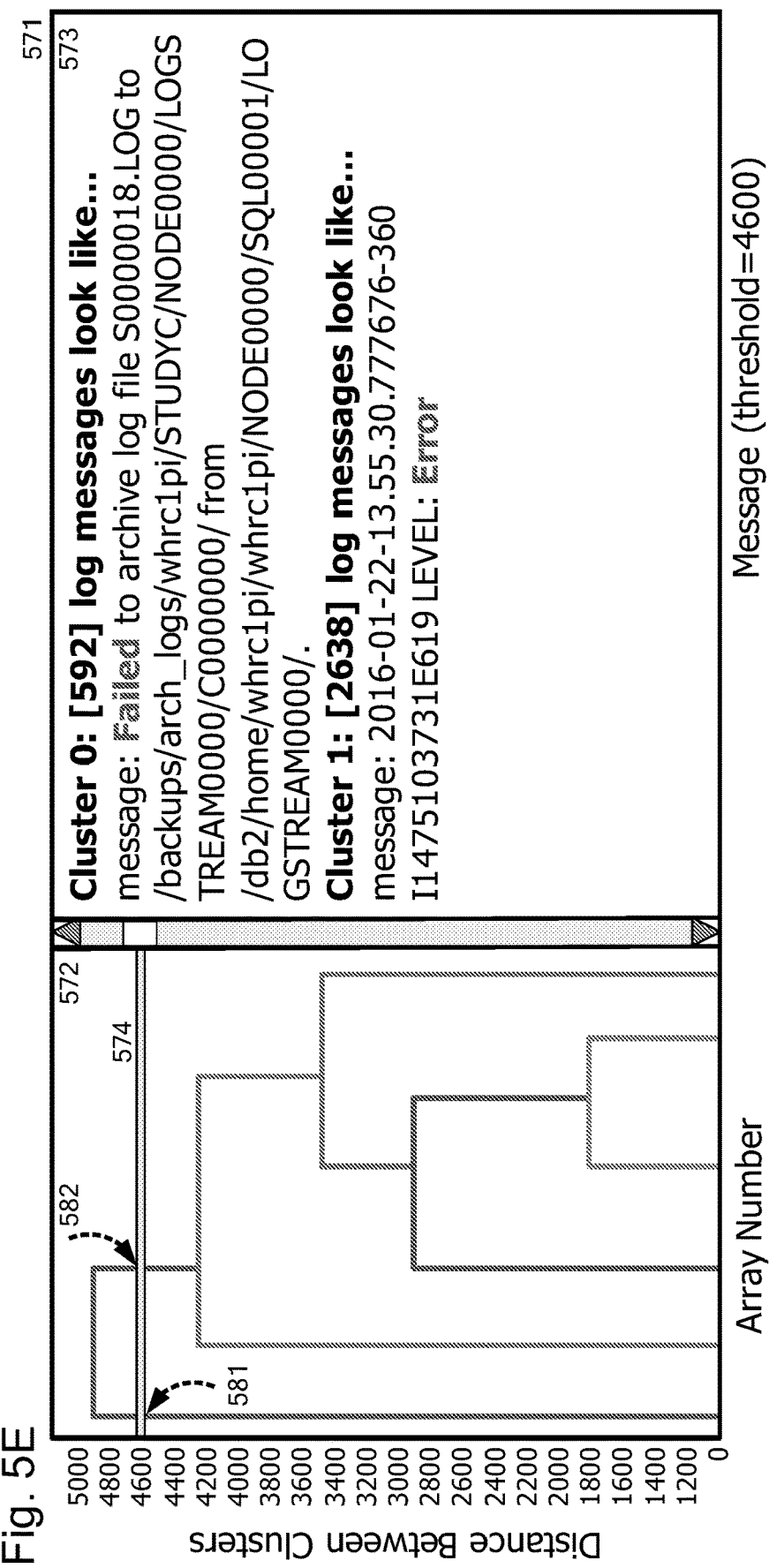

With reference now to FIG. 5E, FIG. 5E illustrates an embodiment of a window (571) displaying a tree diagram window (572) and a message window (573).

The tree diagram window (572) shows the tree diagram which is the same as that displayed on the tree diagram window (512) described in FIG. 5B. The tree diagram window (572) further shows that the bar icon (574) is displayed on the tree graph at a distance between the clusters, 4600. The location of the bar icon (574) mean that a distance between the clusters is set to "4600" or that the number of clusters is set to "two" (581 and 582).

The message window (573) shows two clusters, Clusters 0 and 1, each of which corresponds to each of the two cross points (581 and 582). In each cluster, the following information is displayed: the number of texts in each of the clusters, using "[the number]", and a representative text. In the representative text, one or more predefined terms, such as an attention keyword, may be displayed with highlight in order to draw attention of a user. The highlight may be made, for example, but not limited to, by coloring the keyword, or making the keyword bold or italic. In a case where the representative text obtained after the execution of the hierarchical clustering has a predefined term, the system may send an alert to a user or displaying an alert on a display.

In an embodiment of FIG. 5E, the texts were classified into two clusters. The same arguments described in FIG. 5B applied also to FIG. 5E. Further, even when contents of the texts are more or less different, clusters having a strong degree of approximation can be combined with each other, compared to the embodiments described in FIGS. 5B to 5C. Further, the classification result obtained in the embodiment of FIG. 5E may be similar with that manually classified by a human.

As described in the explanation of FIG. 4 above, a user may set or change a threshold of a distance between the clusters or of the number of clusters using tools displayed in the tools window (403).

The user may further set or change a threshold of a distance between the clusters or of the number of clusters directly on the tree diagram window (512, 532, 552 or 572).

The user may split a cluster or increase the number of clusters, for example, by double-clicking a representative text in each cluster displayed in the message window (513, 533, 553 or 573). In response to the double-clicking of the representative text, the system may split the cluster by increasing the number of clusters, using the tree diagram window.

The user may combine clusters or decrease the number of clusters, for example, by double-clicking two or more representative text in corresponding clusters displayed in the message window (513, 533, 553 or 573). In response to the double-clicking of the two or more representative texts, the system may combine the cluster by decreasing the number of clusters, using the tree diagram window.

Figure 6:
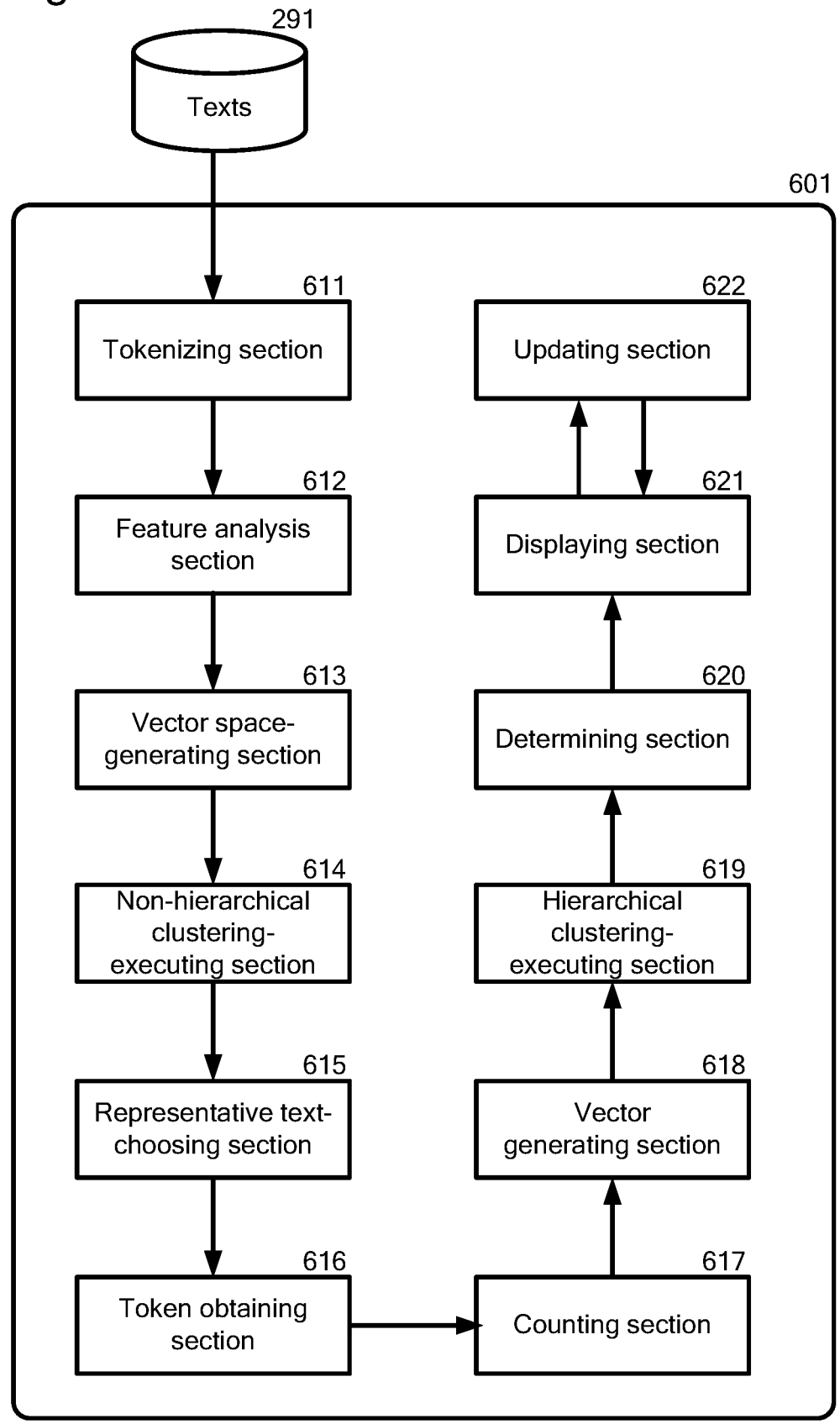
FIG. 6 illustrates an overall functional block diagram of a hardware system that is used in accordance with the embodiment of the overall flowchart described in FIGS. 2A to 2D, according to an example embodiment of the present invention.

With reference now to FIG. 6, FIG. 6 illustrates an embodiment of an overall functional block diagram of a system hardware used in accordance with the embodiment of the overall flowchart described in FIGS. 2A to 2D.

The system (601) may correspond to the computer (101) described in FIG. 1.

The system (601) comprises a tokenizing section (611), a feature-analysis section (612), a vector space-generating section (613), a non-hierarchical clustering-execution section (614), a representative text-choosing section (615), a token obtaining section (616), a counting section (617), a vector generating section (618), a hierarchical clustering-execution section (619), a determining section (620), a displaying section (621) and an updating section (622).

The tokenizing section (611) tokenizes each of the texts to obtain tokens.

The tokenizing section (611) may perform step 202 described in FIG. 2A.

The feature-analysis section (612) performs a feature analysis on each of the tokens generated at the tokenizing section (611) to obtain a feature score and thereby generates a vector having one or more feature scores equal to or larger than a predefined value.

The feature-analysis section (612) may perform step 203 described in FIG. 2A.

The vector space-generating section (613) generates a vector space, using the vectors generated at the feature-analysis section (612).

The vector space-generating section (613) may perform step 204 described in FIG. 2A.

The non-hierarchical clustering-execution section (614) executes non-hierarchical clustering, using the vector space, to generate a plurality of clusters.

The non-hierarchical clustering-execution section (614) may perform steps 205 to 207 described in FIG. 2A.

The representative text-choosing section (615) chooses one representative text in each of the plurality of clusters.

The representative text-choosing section (615) may perform step 208 described in FIG. 2A.

The token obtaining section (616) judges whether the number of clusters is equal to or larger than a predefined number or not and then, if the judgment is positive, obtains tokens of each of the representative texts.

The token obtaining section (616) may perform step 209 described in FIG. 2A and step 210 described in FIG. 2B.

The counting section (617) counts the number of characters in each token in each of the representative texts to generate an array of the number of the characters.

The counting section (617) may perform step 211 described in FIG. 2B.

The vector generating section (618) generates a vector from each of the arrays.

The vector generating section (618) may perform steps 212 to 214 described in FIG. 2B.

The hierarchical clustering-execution section (619) executes hierarchical clustering, using the vectors. The hierarchical clustering-execution section (619)

The hierarchical clustering-execution section (619) may perform step 215 described in FIG. 2B.

The determining section (620) determines a representative text for each of the clusters, in response to a determining of the number of clusters, using a result of the execution of the hierarchical clustering.

The determining section (620) may perform step 216 described in FIG. 2B.

Figure 2D:
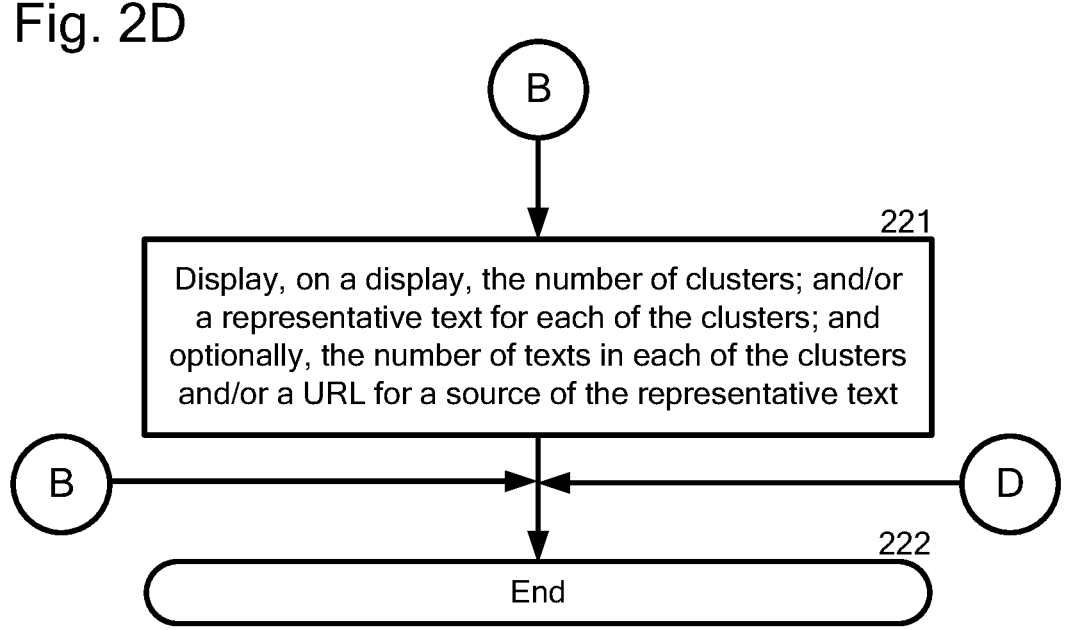

The displaying section (621) may perform steps 217 described in FIG. 2C and step 221 described in FIG. 2D.

The updating section (622) may perform steps 218 to 220.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transparent media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transparent cables, optical transparent fibers, wireless transparent, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The expression "a/one" should be understood as "at least one".

The expression "comprise(s)/comprising a/one" should be understood as "comprise(s)/comprising at least one".

The expression "comprise(s)/comprising" should be understood as "comprise(s)/comprising at least".

The expression "/" should be understood as "and/or".

What is claimed is:

1. A computer-implemented method for summarizing a plurality of texts, the method comprising:
   generating a vector space based on a first set of vectors, wherein each vector includes one or more feature scores determined from tokens of the plurality of texts;
   determining a number of clusters that will be included in a first plurality of clusters when non-hierarchical clustering generates the first plurality of clusters, wherein the number of clusters that will be generated in the non-hierarchical clustering is determined according to a number of texts included in the plurality of texts;
   executing the non-hierarchical clustering using the vector space to generate the first plurality of clusters;
   generating a second set of vectors based on quantities of characters in tokens of first representative texts, wherein each first representative text is selected from a corresponding cluster of the first plurality of clusters, and wherein arrays are generated based on the quantities of characters in the tokens of the first representative texts to generate the second set of vectors when the number of clusters that will be generated in the non-hierarchical clustering is equal to or larger than a predefined number;

aligning a dimension of each of the vectors of the second set of vectors and executing hierarchical clustering using the second set of vectors to generate a second plurality of clusters;

determining a second representative text for each of the clusters included in the second plurality of clusters that represents a summary of the plurality of texts; and displaying, on a display, a visualization of the second plurality of clusters and an element that alters a number of clusters in the second plurality of clusters, wherein when the element alters the number of clusters in the second plurality of clusters, the visualization is automatically changed to reflect the altered number of clusters in the second plurality of clusters.

2. The computer-implemented method of claim 1, wherein executing the hierarchical clustering generates a tree diagram.

3. The computer-implemented method of claim 2, wherein determining the second representative text for each of the clusters in the second plurality of clusters further comprises:

applying a threshold to the tree diagram.

4. The computer-implemented method of claim 3, further comprising:

updating the number of clusters in the second plurality of clusters and the second representative text for each of the clusters in the second plurality of clusters by changing the threshold to a value altering the number of clusters in the second plurality of clusters.

5. The computer-implemented method of claim 1, wherein a number of texts in each of the clusters in the second plurality of clusters is obtained after the execution of the hierarchical clustering.

6. The computer-implemented method of claim 1, wherein the element changes one or more of the number of clusters in the second plurality of clusters and a distance between the clusters in the second plurality of clusters.

7. The computer-implemented method of claim 6, wherein, as a result of the execution of the hierarchical clustering, the display further displays one or more of: a tree diagram; the number of clusters included in the second plurality of clusters; a representative text for each of the clusters in the second plurality of clusters; and a URL for a source of the second representative text.

8. The computer-implemented method of claim 1, further comprising:

sending an alert to a user or displaying an alert on a display when the second representative text for one or more of the clusters in the second plurality of clusters has a predefined term.

9. The computer-implemented method of claim 1, wherein the aligning a dimension of each of the vectors of the second set of vectors comprises:

truncating one or more array elements in each array of the arrays by a predefined number of array elements from a beginning of the array; or padding a tail of each array of the arrays so that a number of digits in each array becomes the predefined number of array elements.

10. The computer-implemented method of claim 1, wherein the number of clusters included in the second plurality of clusters is determined automatically or by a user.

11. A system comprising:

a processor; and a memory storing a program, which, when executed on the processor, summarizes a plurality of texts, the processor configured to perform operations comprising:

generating a vector space based on a first set of vectors, wherein each vector includes one or more feature scores determined from tokens of the plurality of texts;

determining a number of clusters that will be included in a first plurality of clusters when non-hierarchical clustering generates the first plurality of clusters, wherein the number of clusters that will be generated in the non-hierarchical clustering is determined according to a number of texts included in the plurality of texts;

executing the non-hierarchical clustering using the vector space to generate the first plurality of clusters;

generating a second set of vectors based on quantities of characters in tokens of first representative texts, wherein each first representative text is selected from a corresponding cluster of the first plurality of clusters, and wherein arrays are generated based on the quantities of characters in the tokens of the first representative texts to generate the second set of vectors when the number of clusters that will be generated in the non-hierarchical clustering is equal to or larger than a predefined number;

aligning a dimension of each of the vectors of the second set of vectors and executing hierarchical clustering using the second set of vectors to generate a second plurality of clusters;

determining a second representative text for each of the clusters included in the second plurality of clusters that represents a summary of the plurality of texts; and displaying, on a display, a visualization of the second plurality of clusters and an element that alters a number of clusters in the second plurality of clusters, wherein when the element alters the number of clusters in the second plurality of clusters, the visualization is automatically changed to reflect the altered number of clusters in the second plurality of clusters.

12. The system of claim 11, wherein executing the hierarchical clustering generates a tree diagram.

13. The system of claim 12, wherein determining the second representative text for each of the clusters in the second plurality of clusters further comprises one or more of:

applying a threshold to the tree diagram; and updating the number of clusters in the second plurality of clusters and the second representative text for each of the clusters in the second plurality of clusters by changing the threshold to a value altering the number of clusters in the second plurality of clusters.

14. A computer program product for summarizing a plurality of texts, the computer program product comprising one or more computer readable storage media collectively having program instructions embodied therewith that are executable by at least one processor to cause the at least one processor to:

generate a vector space based on a first set of vectors, wherein each vector includes one or more feature scores determined from tokens of the plurality of texts;

determine a number of clusters that will be included in a first plurality of clusters when non-hierarchical clustering generates the first plurality of clusters, wherein the number of clusters that will be generated in the non-hierarchical clustering is determined according to a number of texts included in the plurality of texts;

execute the non-hierarchical clustering using the vector space to generate the first plurality of clusters;

generate a second set of vectors based on quantities of characters in tokens of first representative texts, wherein each first representative text is selected from a corresponding cluster of the first plurality of clusters, and wherein arrays are generated based on the quantities of characters in the tokens of the first representative texts to generate the second set of vectors when the number of clusters that will be generated in the non-hierarchical clustering is equal to or larger than a predefined number;

align a dimension of each of the vectors of the second set of vectors and execute hierarchical clustering using the second set of vectors to generate a second plurality of clusters;

determine a second representative text for each of the clusters included in the second plurality of clusters that represents a summary of the plurality of texts; and display, on a display, a visualization of the second plurality of clusters and an element that alters a number of clusters in the second plurality of clusters, wherein when the element alters the number of clusters in the second plurality of clusters, the visualization is automatically changed to reflect the altered number of clusters in the second plurality of clusters.

15. The computer program product according to claim 14, wherein executing the hierarchical clustering generates a tree diagram.

16. The computer program product according to claim 15, wherein in determining the second representative text for each of the clusters in the second plurality of clusters, the program instructions are executable by the at least one processor to cause the at least one processor to perform at least one of:

apply a threshold to the tree diagram; and update the number of clusters in the second plurality of clusters and the second representative text for each of the clusters in the second plurality of clusters by changing the threshold to a value altering the number of clusters in the second plurality of clusters.

* * * * *